(12) United States Patent
Anthony (10) Patent No.: US 11,657,222 B1
(45) Date of Patent: May 23, 2023

(54) CONFIDENCE CALIBRATION USING PSEUDO-ACCURACY

(71) Applicant: Intuit Inc., Mountain View, CA (US)

(72) Inventor: Peter Caton Anthony, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/993,089

(22) Filed: Nov. 23, 2022

(51) Int. Cl.
  *G06F 40/216* (2020.01)
  *G06F 40/279* (2020.01)
  *G06N 3/08* (2023.01)

(52) U.S. Cl.
  CPC .......... *G06F 40/216* (2020.01); *G06F 40/279* (2020.01); *G06N 3/08* (2013.01)

(58) Field of Classification Search
  CPC ........ G06F 40/216; G06F 40/279; G06N 3/08
  See application file for complete search history.

(56) References Cited

U.S. PATENT DOCUMENTS

2023/0004604 A1\* 1/2023 Li ........................ G06N 5/045

OTHER PUBLICATIONS

Finding the most similar textual documents using Case-Based reasoning, Nov. 1, 2019 (Year: 2019).\*
Semantic Similarity Detection from text document using XLNet with a DKM-Clustered Bi-LSTM, Oct. 3, 2022 (Year: 2022).\*
Correlation between textual similarity and quality of LDA topic model results, May 1, 2019 (Year: 2019).\*
Text Similarity in Vector Space Models: A comparative study, Dec. 1, 2019 (Year: 2019).\*
Efficient Analysis for Extracting Feature and Evaluation of Text Mining using Natural Language Processing Model, Sep. 24, 2021 (Year: 2021).\*
Textual content prediction via fuzzy attention neural network model without predefined knowledge, Jun. 1, 2020 (Year: 2020).\*
A Measure of Similarity in Textual Data Using Spearman's Rank Correlation Coefficient, Nov. 26, 2019 (Year: 2019).\*
A Novel Similarity Measure Framework on Financial Data Mining, Apr. 1, 2010 (Year: 2010).\*
A Supervised Approach For Extractive Text Summarization Using Minimal Robust Features, May 1, 2019 (Year: 2019).\*

(Continued)

*Primary Examiner* — Mohammad K Islam
(74) *Attorney, Agent, or Firm* — Paradice & Li LLP (57) ABSTRACT

Systems and methods for training machine learning models are disclosed. An example method includes receiving a plurality of first outputs and a ground truth value for each first output, each first output including an extracted string and a raw confidence score, determining, for each first output, an accuracy metric based at least in part on the extracted string and its corresponding ground truth value, for each extracted string: determining a similarity metric between the respective extracted string and each other extracted string of the plurality of first outputs, and determining a pseudo-accuracy based at least in part on the determined similarity metrics and the determined accuracy metrics, generating training data based at least in part on the determined pseudo-accuracies and the plurality of first outputs, and training the machine learning model, based on the training data, to predict pseudo-accuracies associated with subsequent outputs from a document extraction model.

20 Claims, 6 Drawing Sheets

(56) References Cited

OTHER PUBLICATIONS

Guo et al., "On calibration of modern neural networks," International Conference on Machine Learning, pp. 1321-1330, PMLR, (Year: 2017).

Jagannatha et al., "Calibrating Structured Output Predictors for Natural Language Processing," Proceedings of the Conference Association for Computational Linguistics Meeting, vol. 2020, 20-pages, NIH Public Access (Year: 2020).

Kull et al., "Beyond Temperature Scaling: Obtaining Well-Calibrated Multi-Class Probabilities with Dirichlet Calibration," Advances in Neural Information Processing Systems, 33rd Conference on Neural Information Processing Systems KNeurIPS 2019), 16-pages, (Year: 2019).

* cited by examiner

| ID 302 | Ground Truth 304 | Extracted 306 | Match? 308 | Edit Distance 310 | Raw Confidence 312 |
|---|---|---|---|---|---|
| a1b2 | dog | clog | 0 | 2 | 0.8 |
| c3d4 | dock | dock | 1 | 0 | 0.7 |
| e5f6 | doge | dog | 0 | 1 | 0.9 |
| g7h8 | dock | clock | 0 | 2 | 0.4 |
| ... | ... | ... | ... | ... | ... |

*Figure 3A*

| ID 1 | Extracted 1 | ID 2 | Extracted 2 | Edit Distance ID 1 - ID 2 | ID 2 Match? | Edit Distance 2 |
|---|---|---|---|---|---|---|
| a1b2 | clog | e5f6 | dog | 2 | 0 | 2 |
| a1b2 | clog | g7h8 | clock | 2 | 0 | 2 |
| a1b2 | clog | c3d4 | dock | 4 | 1 | 0 |
| ... | ... | ... | ... | ... | ... | ... |

CONFIDENCE CALIBRATION USING PSEUDO-ACCURACY

TECHNICAL FIELD

This disclosure relates generally to methods for training machine learning models, and more specifically to the training of machine learning models to predict the accuracy of strings extracted from a document.

DESCRIPTION OF RELATED ART

Machine learning techniques are frequently used for document extraction, that is, determining the content, such as strings of alphanumeric content, of an input document image. To ensure such extractions are accurate, an extraction model may generate a confidence score associated with each extracted text string, indicating a level of confidence, such as a percentage confidence, in the accuracy of each extracted text string. However, such confidence values are often inaccurate. More particularly, such confidence values may not be well calibrated, as returned confidence values may not correlate well to accuracy of the values of the extracted strings. For example, in some extraction models, an average confidence value returned for extracted text strings may be quite high, when the accuracy of the extracted text strings is itself much lower. Additionally, such confidence values may not correlate well with the magnitude of extraction errors.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for predicting pseudo-accuracies for strings extracted by a document extraction model. An example method includes receiving a plurality of first outputs from the document extraction model and a corresponding ground truth value associated with each first output, each first output of the plurality of first outputs including an extracted string and a raw confidence score, determining, for each first output, an accuracy metric based at least in part on the extracted string and the ground truth value associated with the respective first output, for each extracted string of the plurality of first outputs: determining a similarity metric between the respective extracted string and each other extracted string of the plurality of first outputs, and determining a pseudo-accuracy for the respective extracted string based at least in part on the determined similarity metrics and the determined accuracy metrics, generating training data based at least in part on the determined pseudo-accuracies and the plurality of first outputs, and training the machine learning model, based on the training data, to predict pseudo-accuracies associated with subsequent outputs from the document extraction model.

In some aspects, the accuracy metric includes a Boolean indication of whether or not an extracted string matches its respective ground truth value. In some aspects, the Boolean indication indicates whether or not the extracted string fuzzily matches its respective ground truth value.

In some aspects, the accuracy metric indicates a magnitude of error between an extracted string and its respective ground truth value. In some aspects, the magnitude of error is indicated by an edit distance between the extracted string and the respective ground truth value. In some aspects, for a numeric extracted string, the accuracy metric includes an absolute or fractional numeric difference between the numeric extracted string and its respective ground truth value.

In some aspects, determining the similarity metric includes determining a sorted list of the similarity metrics between the respective extracted string and each other extracted string of the plurality of first outputs. In some aspects, the pseudo-accuracy is an average of two or more accuracy metrics of the sorted list, wherein the two or more accuracy metrics include accuracy metrics corresponding to the highest similarity metrics of the sorted list. In some aspects, determining the average of the two or more accuracy metrics includes determining a weighted average of the two or more accuracy metrics. In some aspects, the weighted average is configured to assign a higher weight to accuracy metrics associated with larger extraction errors. In some aspects, weights for the weighted average are determined based at least in part on the similarity metric. In some aspects, weights for the weighted average are based at least in part on the ordering of the sorted list.

In some aspects, the trained machine learning model is configured to predict the pseudo-accuracies based at least in part on extracted strings and raw confidence scores associated with the subsequent outputs.

Another innovative aspect of the subject matter described in this disclosure can be implemented in a system for training a machine learning model to for predicting pseudo-accuracies for strings extracted by a document extraction model. An example system may be associated with a machine learning model and include or more processors, and a memory storing instructions for execution by the one or more processors. Execution of the instructions causes the system to perform operations including receiving a plurality of first outputs from the document extraction model and a corresponding ground truth value associated with each first output, each first output of the plurality of first outputs including an extracted string and a raw confidence score, determining, for each first output, an accuracy metric based at least in part on the extracted string and the ground truth value associated with the respective first output, for each extracted string of the plurality of first outputs: determining a similarity metric between the respective extracted string and each other extracted string of the plurality of first outputs, and determining a pseudo-accuracy for the respective extracted string based at least in part on the determined similarity metrics and the determined accuracy metrics, generating training data based at least in part on the determined pseudo-accuracies and the plurality of first outputs, and training the machine learning model, based on the training data, to predict pseudo-accuracies associated with subsequent outputs from the document extraction model.

Another innovative aspect of the subject matter described in this disclosure can be implemented in a method for predicting degrees of confidence in strings generated by document extraction models. An example method is performed by an electronic device coupled to a machine learning model and includes receiving a plurality of first outputs from the document extraction model and a corresponding ground truth value associated with each first output, each first output of the plurality of first outputs including an extracted string and a raw confidence score, determining, for each first output, an accuracy metric based at least in part on the extracted string and the ground truth value associated with the respective first output, for each extracted string of the plurality of first outputs: determining a similarity metric between the respective extracted string and each other extracted string of the plurality of first outputs, and determining a pseudo-accuracy for the respective extracted string based at least in part on the determined similarity metrics and the determined accuracy metrics, generating training data based at least in part on the determined pseudo-accuracies and the plurality of first outputs, training the machine learning model, based on the training data, to predict pseudo-accuracies associated with subsequent outputs from the document extraction model, receiving a plurality of second outputs from the document extraction model, each second output of the plurality of second outputs including one or more of an extracted string and a raw confidence score, and predicting, using the trained machine learning model, a corresponding pseudo-accuracy for each second output of the plurality of second outputs.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Machine learning models may often be used for document extraction, where an image of a document is provided as input, and the output includes text for one or more portions of the document. Such a machine learning model may be referred to as an extraction model. Extraction models may also return a confidence score associated with each extracted string or group of strings, which may be a value between 0 and 1, such as a percentage, indicating a degree of confidence associated with the extracted string or strings. For example, such a confidence score may represent an estimated likelihood or probability that an extracted string matches the text in the portion of the document from which it was extracted, exactly or within a certain tolerance. Such confidence scores are typically quite overly optimistic. For example, an average confidence score for a set of strings extracted by an extraction model may be 80%, while only 33% of these strings represent accurate extractions. Further, such confidence scores may not be correlated with a degree of error in the associated extracted strings; in other words, higher confidence scores are not well correlated with lower degrees of error, lower confidence scores are not well correlated with higher degrees of error, and so on. The confidence scores may therefore be called poorly calibrated, as they do not correlate well with the accuracy of the associated extracted text string.

Some conventional techniques for simple classifiers may calibrate confidence scores using techniques such as temperature scaling or Dirichlet calibration, but such techniques are not appropriate for classification problems where the accuracy of class prediction is not easily measured. Text extraction is one such problem, where such conventional techniques are not appropriate. Indeed, each prediction for an extracted text string may have a quite large number of classes (e.g., possible predicted values of an extracted text string). Further, many extracted strings may occur only once or twice in a document. It is therefore not feasible to determine an extraction model's confidence for each such class when making a single prediction, or its accuracy in assigning portions of text from the document to a particular class over the course of many predictions. Moreover, conventional confidence calibration techniques treat all classification errors the same. For example, each example may either be assigned to the right class or a wrong class, with no concept of some wrong classes representing larger errors than others. These techniques cannot adjust confidence scores for text extraction based on degree of error. It would therefore be desirable to train a machine learning model to generate a better calibrated predictor for the accuracy of extracted text, such as a predictor which correlates better with the accuracy of the extracted text and with the magnitude of error in such extractions.

Implementations of the subject matter described in this disclosure may be used to train machine learning models to predict pseudo-accuracies associated with text strings generated by an extraction model. Such a pseudo-accuracy for a given extracted text string may be generated based on the accuracy of extractions of text strings similar to the given extracted text string. These pseudo-accuracies may be better calibrated than raw confidence scores provided by the extraction model, in that the pseudo-accuracies may have values better correlated with the frequency of correctness and/or magnitude of error of the extracted text. Moreover, pseudo-accuracies may be better calibrated than scores resulting from calibrating such raw confidence scores using conventional techniques. The pseudo-accuracies may be weighted using appropriate weights, such as similarity of the similar text string to the given extracted text string, or magnitude of extraction error. These, and other aspects of the example implementations are discussed further below.

Various implementations of the subject matter disclosed herein provide one or more solutions to the technical problem of training a machine learning model to calibrate confidence scores for document extraction models. As discussed above, conventional techniques for confidence calibration are inappropriate for document extraction, as they quickly become infeasibly complicated due to the large numbers of classes for each extracted text string. In contrast, the present implementations may train a machine learning model to predict pseudo-accuracies using training data based on the accuracies of extractions of similar text strings. Such pseudo-accuracies may be much better correlated with the magnitude of extraction error than raw confidence scores and may provide a significantly improved estimate of the accuracy of an associated extracted text string. In addition, the use of similar text strings for determining the pseudo-accuracies significantly mitigates problems associated with text strings which appear only rarely, such as once or twice, in a document. More specifically, various aspects of the present disclosure provide a unique computing solution to a unique computing problem that did not exist prior to the use of machine learning models for extracting text from input document images. As such, implementations of the subject matter disclosed herein are not an abstract idea such as organizing human activity or a mental process that can be performed in the human mind—indeed, the human mind is not capable of training a machine learning model, much less of training a machine learning model to predict an accuracy associated with an output from another machine learning model.

Moreover, various aspects of the present disclosure effect an improvement in the technical field of machine learning prediction by training a machine learning model to predict an improved accuracy metric for document extraction as compared to raw confidence scores. Training the machine learning model to predict such an improved accuracy metric cannot be performed in the human mind, much less using pen and paper.

Figure 1:
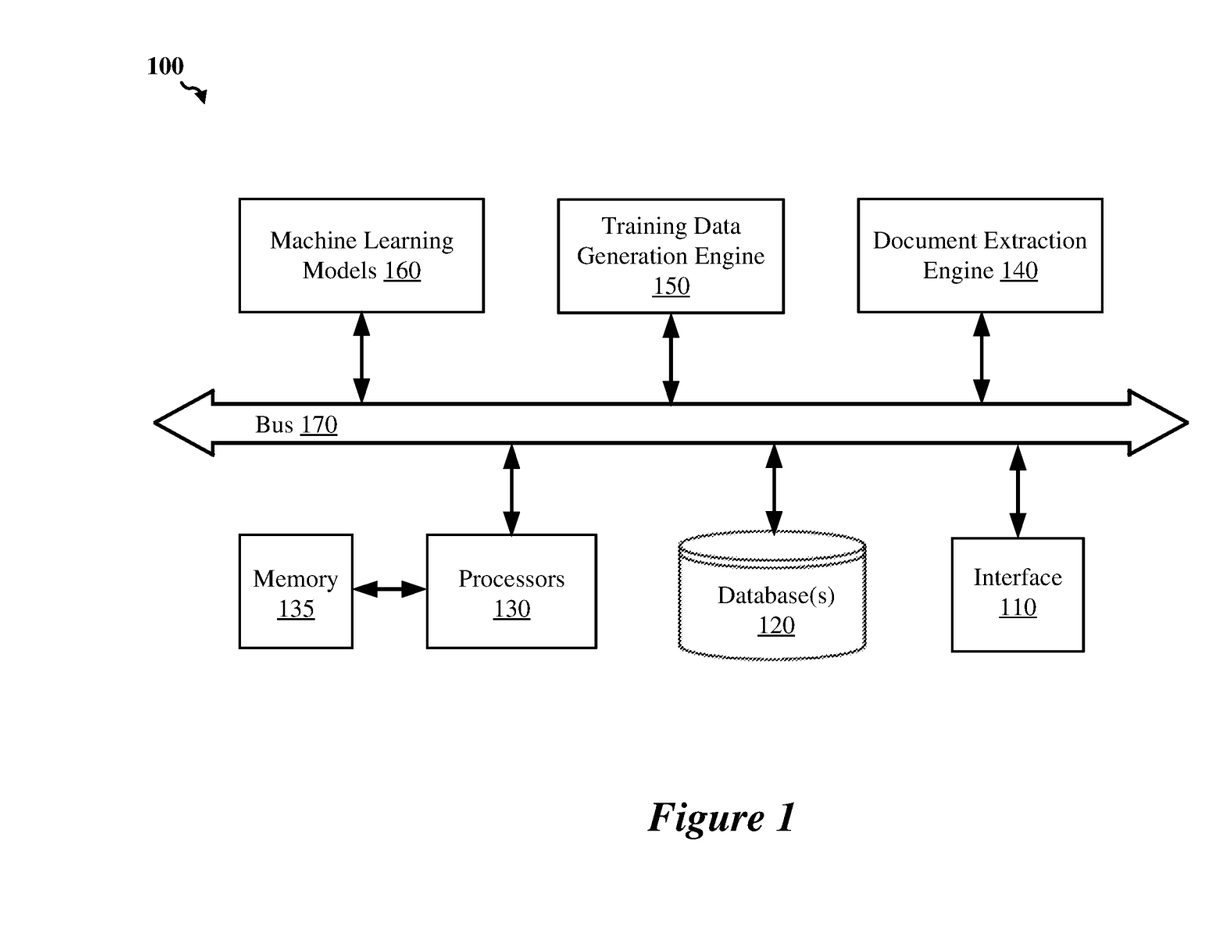
FIG. 1 shows a machine learning training system, according to some implementations.

FIG. 1 shows a machine learning training system 100, according to some implementations. The machine learning training system 100 is shown to include an input/output (I/O) interface 110, a database 120, one or more data processors 130, a memory 135 coupled to the data processors 130, a document extraction engine 140, a training data generation engine 150, and one or more machine learning models 160. In some implementations, the various components of the machine learning training system 100 may be interconnected by at least a data bus 170, as depicted in the example of FIG. 1. In other implementations, the various components of the machine learning training system 100 may be interconnected using other suitable signal routing resources.

The interface 110 may include a screen, an input device, and other suitable elements that allow a user to provide information to the machine learning training system 100 and/or to retrieve information from the machine learning training system 100. Example information that can be provided to the machine learning training system 100 may include configuration information for the machine learning training system 100, training data for the machine learning models 160, such as including a plurality of outputs of a document extraction model, such as document extraction engine 140, ground truth values associated with the plurality of outputs of the document extraction model, and so on. Example information that can be retrieved from the machine learning training system 100 may include data representing a machine learning model trained by the machine learning training system 100, prediction data generated by the machine learning training system 100, such as predicted pseudo-accuracies associated with text extractions generated by the document extraction engine 140, and the like.

The database 120, which may represent any suitable number of databases, may store any suitable information pertaining to training and input data for the machine learning models 160, configuration information for the machine learning training system 100, one or more rules or algorithms for training the machine learning models 160, or the like. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the machine learning training system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The document extraction engine 140 may generate extracted text strings and associated raw confidence scores based on input document images. More particularly, the document extraction engine 140 may include one or more machine learning models configured to receive documents as input, such as images of documents, and to return text from one or more portions of the documents as output. The document extraction engine 140 may include one or more deep neural networks (DNNs), which may have any suitable architecture, such as a feedforward architecture or a recurrent architecture. The document extraction engine 140 may incorporate one or more supervised or unsupervised machine learning techniques for returning the text from the input document images. The document extraction engine 140 may also return a raw confidence score associated with extracted text strings.

The training data generation engine 150 may generate training data for training the machine learning models 160 using a plurality of outputs from the document extraction engine 140 and a ground truth value associated with each output from the document extraction engine 140. The training data may, for example, be stored in the database 120. As discussed in more detail below with respect to FIGS. 3A-3B, generating the training data may include generating a pseudo-accuracy associated with each output of a plurality of outputs of the document extraction engine 140.

The machine learning models 160 may include any number of machine learning models that can be used to predict labels to assign to input data provided to the machine learning models 160. A machine learning model can take the form of an extensible data structure that can be used to represent sets of words or phrases and/or can be used to represent sets of attributes or features. The machine learning models 160 may be seeded with historical data indicating relationships between field values and values of dependent fields for one or more historical users. In some implementations, the machine learning models 160 may include deep neural networks (DNNs), which may have any suitable architecture, such as a feedforward architecture or a recurrent architecture. In addition or in the alternative, the machine learning models may be based on algorithms such as logistic regression, decision trees, random forest regressors, ensembles of decision trees, and so on. The machine learning models 160 may predict pseudo-accuracies associated with outputs of the document extraction engine 140. The machine learning models 160 may be trained using training data generated by the training data generation engine 150.

The particular architecture of the machine learning training system 100 shown in FIG. 1 is but one example of a variety of different architectures within which aspects of the present disclosure may be implemented. For example, in other implementations, the machine learning training system 100 may not include document extraction engine 140, the functions of which may be implemented by the processors 130 executing corresponding instructions or scripts stored in the memory 135. In some other implementations, the functions of the training data generation engine 150 may be performed by the processors 130 executing corresponding instructions or scripts stored in the memory 135. Similarly, the functions of the machine learning models 160 may be performed by the processors 130 executing corresponding instructions or scripts stored in the memory 135.

Figure 2:
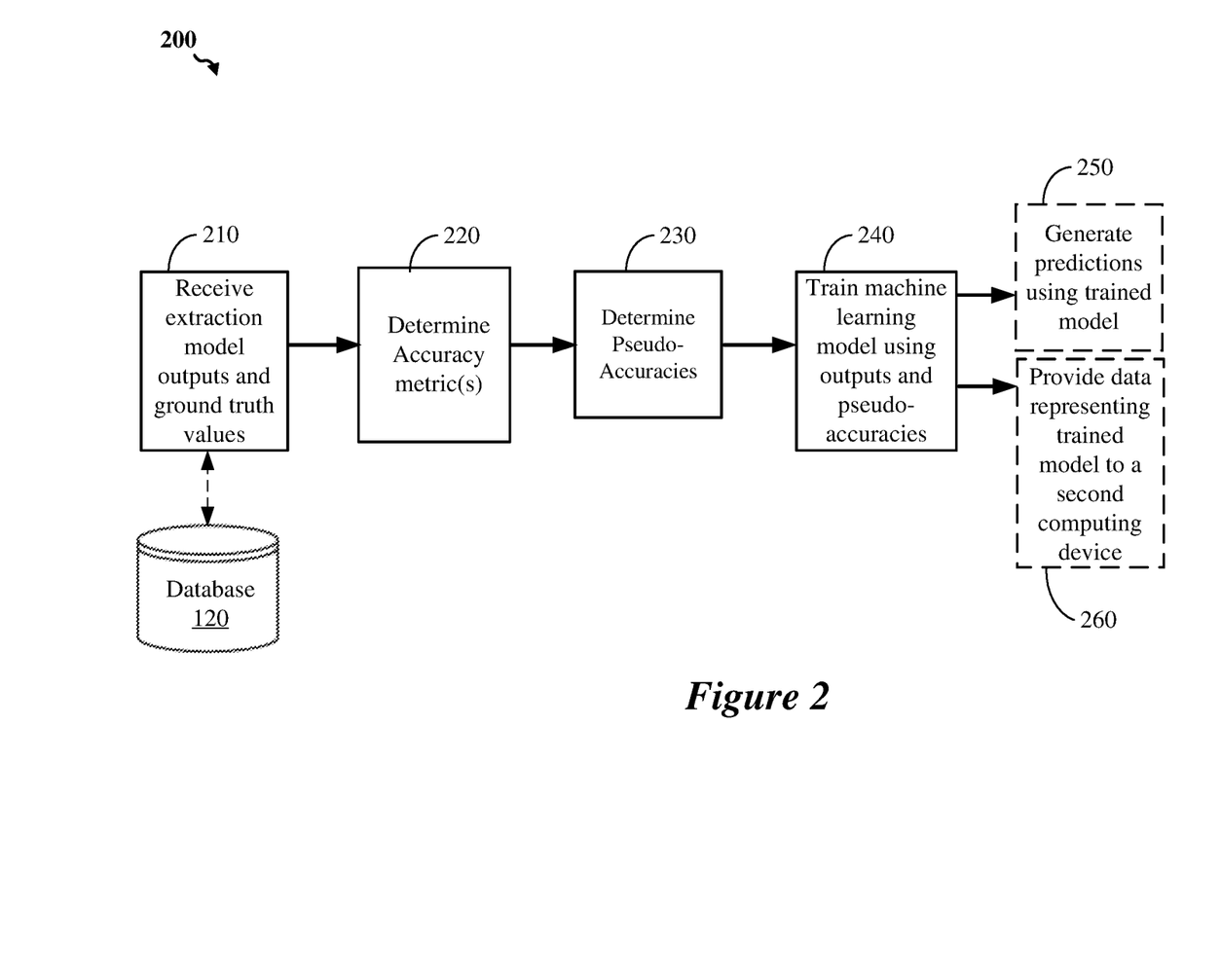
FIG. 2 shows a high-level overview of an example process flow that may be employed by the machine learning training system of FIG. 1.

FIG. 2 shows a high-level overview of an example process flow 200 that may be employed by the machine learning training system 100 of FIG. 1. In block 210, the machine learning training system 100 receives a plurality of outputs from an extraction model and an associated ground truth value for each output of the plurality of outputs. For example, the plurality of outputs may be received from the document extraction engine 140 or may be received via one or more network interfaces coupled to the machine learning training system 100 or retrieved from the database 120 or another memory coupled to the machine learning training system 100. The ground truth values may also be received via one or more network interfaces coupled to the machine learning training system 100 or retrieved from the database 120 or another memory coupled to the machine learning training system 100. In block 220, the machine learning training system 100 may determine an accuracy metric for each output of the plurality of outputs. For example, the accuracy metric may include a Boolean indication of whether or not an extracted string of the output matches the corresponding ground truth value, or the accuracy metric may indicate a magnitude of error between the extracted string and the corresponding ground truth value. In block 230, the machine learning training system 100 may determine a pseudo-accuracy for each output of the plurality of outputs, as discussed in more detail below. In block 240, the machine learning training system 100 may train the machine learning model 160 using the outputs of the plurality of outputs and the determined pseudo-accuracies. For example, the training may train the machine learning model to determine a pseudo-accuracy for subsequent outputs of the document extraction engine 140 based at least in part on the extracted string of an output and a corresponding raw confidence score of the output. Optionally, in block 250, the trained machine learning model 160 may generate one more predicted pseudo-accuracies for subsequent outputs of the document extraction engine 140. In block 260, the machine learning training system 100 may optionally provide data representing the trained machine learning model to a second computing device. For example, after training the machine learning model 160, data representing the trained machine learning model may be sent to the second computing device so that the second computing device may generate one or more predicted pseudo-accuracies for subsequent outputs of a document extraction model by executing the data representing the trained machine learning model.

As discussed above, confidence scores associated with text extracted by a document extraction model may be both overly optimistic and may fail to provide an indication of the magnitude of error in the associated extracted text. Because text in a document may have a large number of potential values ("classes"), and many strings may occur very infrequently in a document, accurately determining a confidence value which indicates how close the extracted text is to the ground truth value presents challenges. For example, conventional techniques such as temperature scaling and Dirichlet calibration do not consider the magnitude of extraction errors, and do not yield lower confidence scores for larger errors. The example implementations train a machine learning model to determine a "pseudo-accuracy" for outputs of a document extraction model, where the pseudo-accuracy represents a better calibrated confidence score for extracted strings. As such, the pseudo-accuracy of an extracted string better represents the long-run accuracy of extracting the same string many times from disparate contexts, and/or has a value which is better correlated with the magnitude of extraction error. The pseudo-accuracy for a given string may be determined based on the extraction accuracy of strings similar to the given string. Further, such pseudo-accuracy measures may be weighted, for example based on the similarity of the similar strings to the given string or based on the extraction accuracy of the similar strings. Training a machine learning model to predict such pseudo-accuracies may enable more accurate prediction of extraction accuracy.

Training a machine learning model, such as one of the machine learning models 160, to predict pseudo-accuracies for outputs generated by a document extraction model, such as the document extraction engine 140, may be based on suitable training data. Such training data may be generated based on a plurality of outputs of the document extraction model, including extracted strings and associated raw confidence scores, combined with a ground truth value corresponding to each extracted string. One or more accuracy metrics may be generated for each extracted string based on a comparison of the extracted string with its respective ground truth value. For example, such an accuracy metric may be a Boolean indication of whether or not the extracted string matches the ground truth value. Such a Boolean indication may indicate whether the match is exact, or whether the match is a fuzzy match or an approximate string match. For example, a fuzzy or approximate string match may indicate that strings have at least a threshold degree of similarity, such as an edit distance below a threshold. In some other implementations, the accuracy metric may indicate a magnitude of extraction error. For example, the magnitude of extraction error may be indicated by an edit distance between the extracted string and the ground truth value, indicating a minimum number of operations required to transform the extracted string into the ground truth value. Such an edit distance may be normalized to the length of either the extracted string or the ground truth value. When the strings are numeric, the magnitude of error may be indicated by an absolute or fractional numeric difference between the extracted string and the ground truth value.

For each extracted string, a similarity metric may be determined with respect to each other extracted string in the plurality of outputs of the document extraction model. Such a similarity metric may be an edit distance between the two strings—in other words, a lower edit distance indicates a greater degree of similarity. A list may be generated of the most similar extracted strings to each given extracted string of the plurality of outputs. This list may be sorted based on the similarity metric. For example, the list may be sorted from most similar to least similar, such as from least edit distance to greatest edit distance. The pseudo-accuracy for each extracted string in the plurality of outputs may be determined based on an average of the accuracy metrics of a number of most similar extracted strings. This number may be predetermined, or may result from setting a similarity threshold, such that any similar extracted strings with similarity metrics above the threshold are reflected in the average. For a given extracted string the average of the accuracy metrics of the most similar extracted strings may be an unweighted average or a weighted average. The weighted average may assign larger weights to the accuracy metrics of other extracted strings having larger extraction errors, such as larger edit distances between these strings and their respective ground truth values. In addition, or in the alternative, the weighted average may assign larger weights to the accuracy metrics of other extracted strings which are more similar to the given extracted string, for example based on the similarity metric. For example, the weight associated with each other extracted string may be inversely proportional to the edit distance between the other extracted string and the given extracted string. In some aspects, weights are based on an ordering of the sorted list of most similar extracted strings, such as on a rank of the similarity metric. For example, if R is the rank of the similarity metric of another extracted string with respect to a given extracted string, such that R=1 corresponds to the other extracted string most similar to the given extracted string, R=2 corresponds to the second most similar extracted string, and so on, then a pseudo-accuracy for the given extracted string may be calculated by averaging together accuracy metrics of the most similar extracted strings with weights proportional to $1/R$, $1/R^2$, $e^{-R}$, or any other appropriate function of R.

In some aspects, rather than determining the similarity metric between a first extracted string and each other extracted string in the plurality of outputs, the similarity metric may be computed for only a sampling of the other extracted strings in the plurality of outputs. For example, in large documents, computing the similarity metric for each pair of extracted strings may be undesirably computationally expensive. In some aspects, the similarity metric may be computed between the first extracted string and a sampled subset of the other extracted strings in the plurality of outputs. For example, the sampled subset may be a randomly or pseudorandomly determined subset of the other extracted strings. In some aspects, the sampled subset may have a predetermined size, such that the similarity metric is computed for a fixed number of pairs of strings (i.e., the first extracted string and each extracted string of the fixed size sampled subset). In some aspects, the similarity metric may only be computed for extracted strings having attributes in common with the first extracted string. For example, the similarity metric may be computed only between the first extracted string and other strings extracted from the same portion of a document as the first extracted string. A portion of a document common to the first extracted string and other extracted strings may be, for example, a sentence, paragraph, block of text, section, chapter, page, or region of a page. Two strings may also be considered to be extracted from the same portion of a document if the distance between them (in centimeters, pixels, etc.) in an image of the document is less than a predetermined threshold, or if the number of words, characters, or other strings separating them in the document is less than a predetermined threshold. Instead or in addition, the similarity metric may be computed between the first extracted string and each other extracted string having approximately the same length as the extracted string. As an example, if the first extracted string includes N characters, the similarity metric may only be computed for other extracted strings having within K characters of N, that is, the similarity metric may be computed for other extracted strings of the plurality of outputs having N±K characters.

The machine learning model, such as the machine learning model 160, may then be trained to predict such pseudo-accuracies based on the outputs of the document extraction model, such as the raw confidence scores and the extracted strings. For example, such training data may include the extracted strings and the corresponding pseudo-accuracies for the plurality of outputs of the document extraction model. In some aspects, the raw text of the extracted strings may not be included in the training data but replaced by features of the extracted strings, such as a number and/or proportion of alphabetical characters, numeric characters, and special characters of the extracted strings. In some aspects the training data may include features relating to the extracted strings such as dimensions or area of an optical character recognition (OCR) bounding box of the extracted strings. In some aspects, the training data may include attributes relating to a document type from which the strings were extracted, such as a letter, an invoice, a tax form, a text message, and so on.

In some aspects, the trained machine learning model may then be used by the machine learning training system 100 to predict pseudo-accuracies for subsequently generated outputs of the document extraction engine 140. In some other aspects, one or more files or parameters representing the trained machine learning model may be provided to one or more other devices or systems, for the one or more other devices or systems to predict pseudo-accuracies associated with the outputs of the document extraction model, or with other document extraction models similar to the document extraction engine 140. As described above, such pseudo-accuracy metrics may more accurately predict the accuracy of extracted strings and may indicate a more accurate magnitude of extraction error than conventional confidence scores.

Figure 3A:
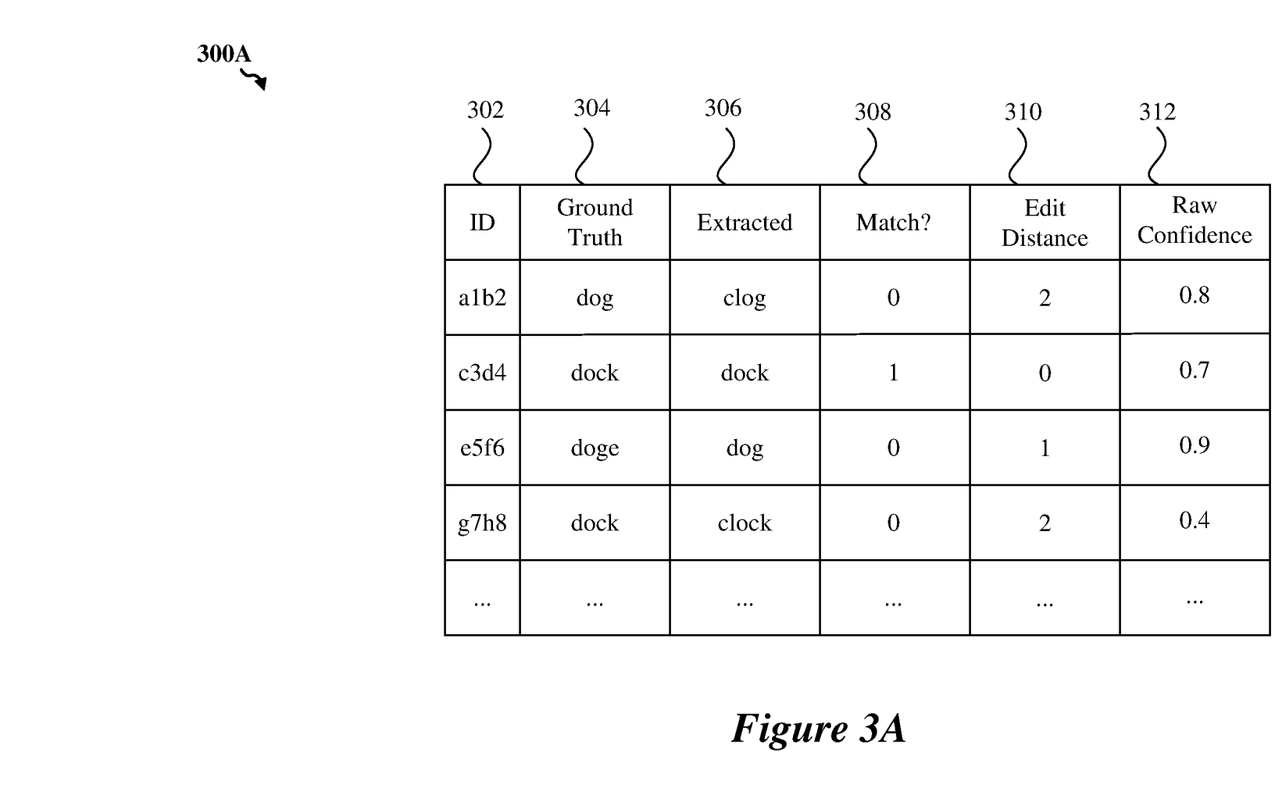
FIG. 3A shows an example table including example outputs of a document extraction model and associated ground truth values.

FIG. 3A shows an example table 300A including example outputs of a document extraction model and associated ground truth values. FIG. 3A also includes example accuracy metrics, such as the Boolean indication and the edit distance described above. FIG. 3A is a table including an example set of data from which training data may be generated for predicting pseudo accuracies for document extraction, according to some implementations. Note that while table 300A only shows five rows of data, that this is for simplicity only, and the table 300A may include any number of rows depending on the number of outputs of the document extraction model. The table 300A includes an ID column 302 including an identifier for each output, such as "a1b2" for the first row. The table 300A includes a ground truth column 304 including a ground truth value for each output, such as a ground truth value of "dog" for ID a1b2. The table 300A includes an extracted column 306 including the string extracted by the document extraction model for each output, such as an extracted value "clog" for ID a1b2. The table 300A includes a match column 308 including a 1 when the extracted string exactly (or alternately fuzzily) matches the ground truth value and 0 otherwise, such as a 0 for ID a1b2, as "clog" does not match "dog." The table 300A includes an edit distance column 310 including an edit distance between the extracted string and the ground truth for each output, such as an edit distance of 2 indicating that two character operations are required to transform "clog" into "dog." Finally, the table 300A includes a raw confidence column 312 including a raw confidence score for each output, such as a raw confidence 0.8 for ID a1b2. The columns 308 and 310 may present examples of the accuracy metric as discussed above, being respective examples of the Boolean indication and the magnitude of the extraction error.

Figure 3B:
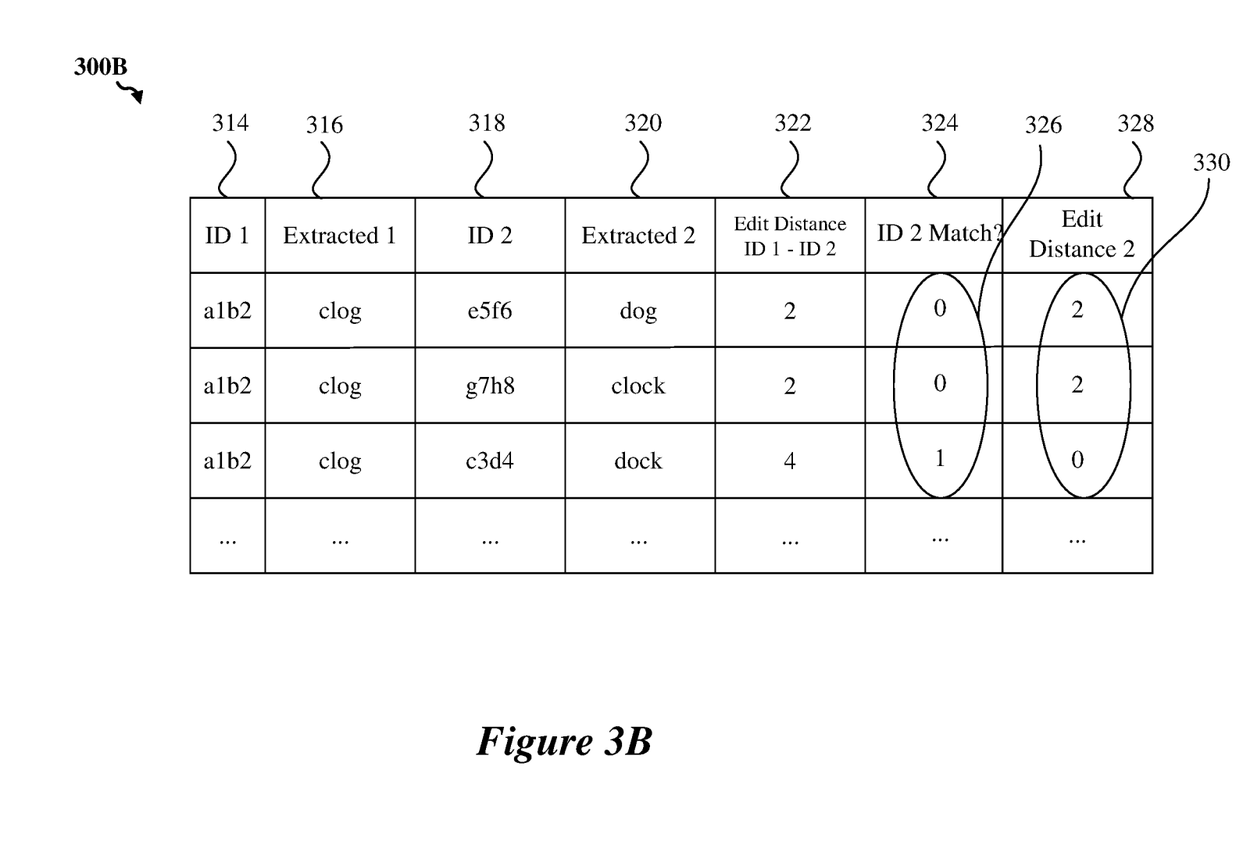
FIG. 3B shows an example table representing the table of FIG. 3A cross-joined to itself.

As discussed above, for each extracted string, such as for each extracted string of column 306 of table 300A, a similarity metric may be determined with respect to each other extracted string in the plurality of outputs of the document extraction model. When such extracted strings are represented in a table such as table 300A, this comparison may be enabled by cross joining the table 300A to itself. FIG. 3B shows an example table 300B representing the table 300A of FIG. 3A cross-joined to itself. More particularly, FIG. 3B shows a portion of the comparisons between the extracted string for ID a1b2 and other strings of the table 300A. The table 300B is shown to include a column 314 including a first ID, a column 316 including an extracted string corresponding to the first ID, a column 318 including second ID indicating the ID of an output to be compared with the output having the first ID, a column 320 including an extracted string corresponding to the second ID, an edit distance column 322 indicating an edit distance between the column 316 and the column 320, an ID 2 match column 324 indicating whether the extracted string from column 320 exactly or fuzzily matches its respective ground truth value, and an edit distance 2 column 328 indicating an edit distance between the extracted string from column 320 and its respective ground truth value.

The rows of the table 300B may first be sorted by the first ID of column 314. For example, the portion of the table 300B depicted in FIG. 3B shows rows where column 314 includes the ID a1b2. The rows having the same value of the column 314 may then be sorted by the edit distance between the extracted strings corresponding to the first ID and the second ID. This edit distance is represented in the column 322. As discussed above, such an edit distance may be a suitable similarity metric for identifying similar extracted strings. That is, the edit distance for ID 1 and ID 2 in column 322 may be a suitable similarity metric for determining when the extracted string of column 316 is similar to the extracted string of column 320. Thus, because the edit distances corresponding to ID a1b2 and each of IDs e5f6 and g7h8—namely 2—are less than the edit distance corresponding to IDs a1b2 and c3d4-4—the row including ID c3d4 in column 318 follows the rows including IDs e5f6 and g7h8 in column 318.

The pseudo-accuracy for ID a1b2 may then be determined based on an average of the accuracy metric for a predetermined number N of the other extracted strings most similar to the extracted string for ID a1b2. N can be set based on the amount of training data available. It can be a fixed number (e.g. 10, 100, or 1000) or based on a fraction (e.g. 1% or 10%) of the number of similarity calculations made between each extracted string and other extracted strings. In the illustrated example, when N is 3 and the accuracy metric is the Boolean indication, in other words the ID 2 match column 324, the pseudo-accuracy for ID a1b2 may be given as an average of 0, 0, and 1, as indicated by the selection 326, resulting in a pseudo-accuracy of roughly 0.33. Similarly, when the N is 3 and the accuracy metric is the magnitude of extraction error (column 328), the pseudo-accuracy may be determined by an average of 2, 2, and 0, as indicated by the selection 330, resulting in a pseudo-accuracy of roughly 0.66. Note that depending on the accuracy metric, higher pseudo-accuracy may indicate higher predicted extraction accuracy (e.g., when the Boolean indication is the accuracy metric), or lower predicted extraction accuracy (e.g., when the edit distance is the accuracy metric).

Further, while the above example pseudo-accuracies were determined using an unweighted average, as discussed above, a weighted average may also be used for determining the pseudo-accuracies. For example, when determining a pseudo-accuracy for a given extracted string, accuracy metrics may be weighted higher for extracted strings associated with higher extraction errors or weighted higher for extracted strings more similar to the given extracted string. For the example in FIG. 3B, weighting accuracy metrics higher for extracted strings associated with larger extraction errors may be weighting the accuracy metrics higher for IDs e5f6 and g7h8 than for ID c3d4, as the former have larger extraction errors (edit distance 2 in column 328) than the latter (edit distance 0 in column 328). Weighting accuracy metrics higher for extracted strings more similar to the given extracted string may include weighting the accuracy metrics higher for IDs e5f6 and g7h8 than for ID c3d4, as the former have lower edit distances (edit distance 2 in column 322) than the latter (edit distance 4 in column 322).

The machine learning model, such as the machine learning model 160, may then be trained to predict such pseudo-accuracies based on the outputs of the document extraction model, such as the raw confidence scores and the extracted strings. For example, such training data may include the extracted strings and the corresponding pseudo-accuracies for the plurality of outputs of the document extraction model.

Figure 4:
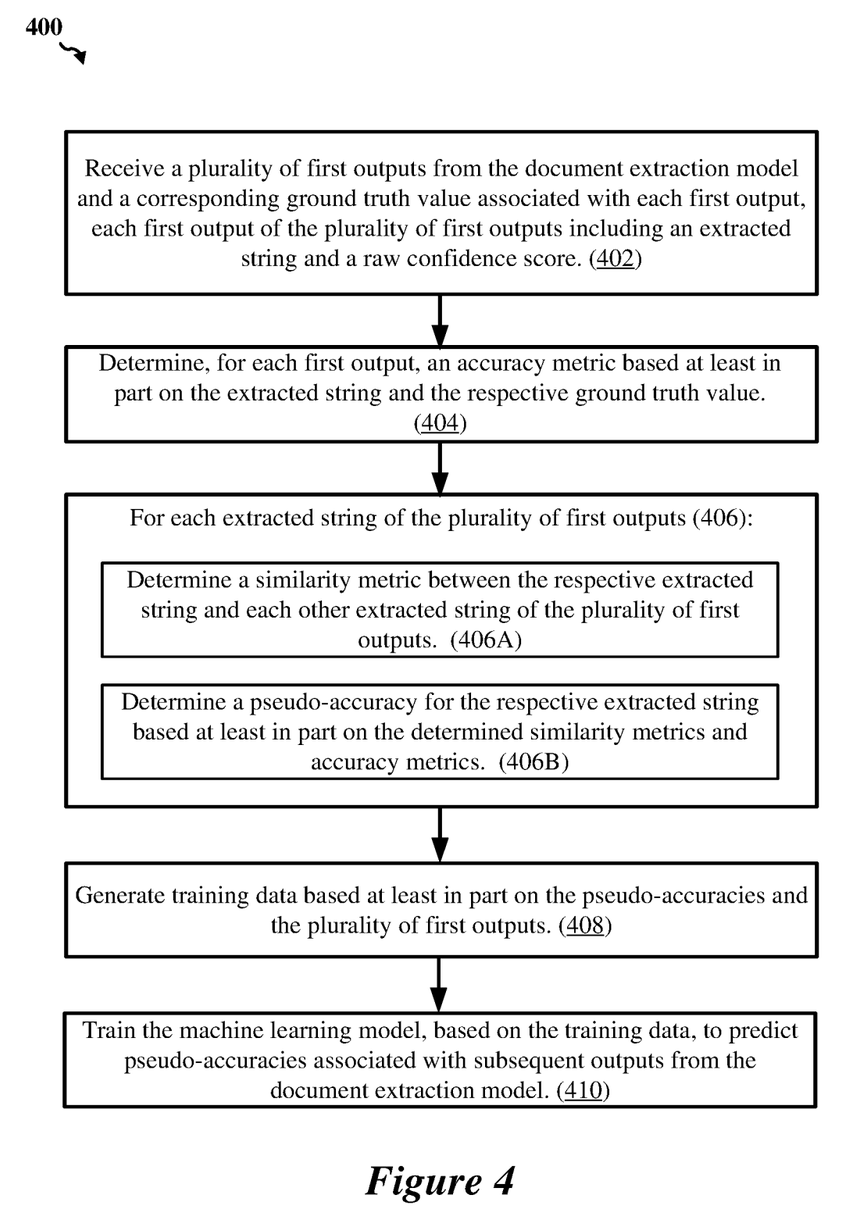
FIG. 4 shows an illustrative flow chart depicting an example operation for training a machine learning model to predict a pseudo-accuracy for strings extracted by a document extraction model, according to some implementations.

FIG. 4 shows an illustrative flow chart depicting an example operation 400 for training a machine learning model to predict a pseudo-accuracy for strings extracted by a document extraction model, according to some implementations. The example operation 400 may be performed by one or more processors of a computing device, and in some implementations, the example operation 400 may be performed using the machine learning training system 100 of FIG. 1. It is to be understood that the example operation 400 may be performed by any suitable systems, computers, or servers.

At block 402, the machine learning training system 100 receives a plurality of first outputs from a document extraction model and a corresponding ground truth value associated with each first output, where each first output of the plurality of first outputs includes an extracted string and a raw confidence value. At block 404, the machine learning training system 100 determines, for each first output, an accuracy metric based at least in part on the extracted string and the respective ground truth value. At block 406, the machine learning training system 100, for each respective extracted string of the plurality of first outputs: determines (406A) a similarity metric between the respective extracted string and each other extracted string of the plurality of first outputs and determines (406B) a pseudo-accuracy for the respective extracted string based at least in part on the determined similarity metrics and the determined accuracy metrics. At block 408, the machine learning training system 100 generates training data based at least in part on the pseudo-accuracies and the plurality of first outputs. At block 410, the machine learning training system 100 trains the machine learning model, based on the training data, to predict pseudo-accuracies associated with subsequent outputs from the document extraction model.

In some aspects, the accuracy metric includes a Boolean indication of whether or not an extracted string matches its respective ground truth value. In some aspects, the Boolean indication indicates whether or not the extracted string fuzzily matches its respective ground truth value.

In some aspects, the accuracy metric indicates a magnitude of error between an extracted string and its respective ground truth value. In some aspects, the magnitude of error is indicated by an edit distance between the extracted string and the respective ground truth value. In some aspects, for a numeric extracted string, the accuracy metric includes an absolute or fractional numeric difference between the numeric extracted string and its respective ground truth value.

In some aspects, determining the similarity metric in block 406A includes determining a sorted list of the similarity metrics between the respective extracted string and each other extracted string of the plurality of first outputs. In some aspects, the pseudo-accuracy is an average of two or more accuracy metrics of the sorted list, wherein the two or more accuracy metrics include accuracy metrics corresponding to the highest similarity metrics of the sorted list. In some aspects, determining the average of the two or more accuracy metrics includes determining a weighted average of the two or more accuracy metrics. In some aspects, the weighted average is configured to assign a higher weight to accuracy metrics associated with larger extraction errors. In some aspects, weights for the weighted average are determined based at least in part on the similarity metric. In some aspects, weights for the weighted average are based at least in part on the ordering of the sorted list.

In some aspects, the trained machine learning model is configured to predict the pseudo-accuracies based at least in part on extracted strings or raw confidence scores associated with the subsequent outputs.

Figure 5:
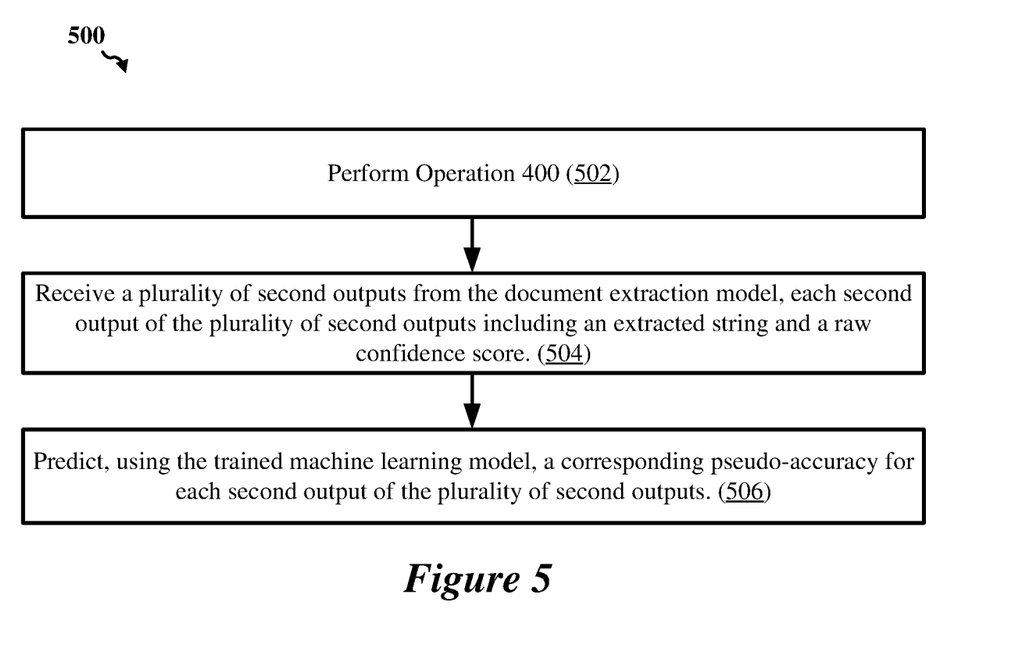
FIG. 5 shows an illustrative flow chart depicting an example operation for predicting degrees of confidence in strings generated by document extraction models, according to some implementations.

FIG. 5 shows an illustrative flow chart depicting an example operation 500 for predicting degrees of confidence in strings generated by document extraction models, according to some implementations. The example operation 500 may be performed by one or more processors of a computing device, and in some implementations, the example operation 500 may be performed using the machine learning training system 100 of FIG. 1. It is to be understood that the example operation 500 may be performed by any suitable systems, computers, or servers.

At block 502, the machine learning training system 100 trains the machine learning model using the steps of operation 400. At block 504, the machine learning training system 100 receives a plurality of second outputs from the document extraction model, where each second output of the plurality of second outputs includes one or more of an extracted string and a raw confidence score. At block 506, the machine learning training system 100 predicts, using the trained machine learning model, a corresponding pseudo-accuracy for each second output of the plurality of second outputs.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of training a machine learning model to predict pseudo-accuracies for strings extracted by a document extraction model, the method performed by an electronic device coupled to the machine learning model and comprising:
receiving a plurality of first outputs from the document extraction model and a corresponding ground truth value associated with each first output, each first output of the plurality of first outputs comprising an extracted string and a raw confidence score;
determining, for each first output of the plurality of first outputs, an accuracy metric based at least in part on the extracted string and the ground truth value associated with the respective first output;
for each extracted string of the plurality of first outputs:
determining a similarity metric between the respective extracted string and each other extracted string of the plurality of first outputs; and
determining a pseudo-accuracy for the respective extracted string based at least in part on the determined similarity metrics and the determined accuracy metrics;
generating training data based at least in part on the determined pseudo-accuracies and the plurality of first outputs; and
training the machine learning model, based on the training data, to predict pseudo-accuracies associated with subsequent outputs from the document extraction model.

2. The method of claim 1, wherein the accuracy metric comprises a Boolean indication of whether or not an extracted string matches its respective ground truth value.

3. The method of claim 2, wherein the Boolean indication indicates whether or not the extracted string fuzzily matches its respective ground truth value.

4. The method of claim 1, wherein the accuracy metric indicates a magnitude of error between an extracted string and its respective ground truth value.

5. The method of claim 4, wherein the accuracy metric comprises an edit distance between the extracted string and its respective ground truth value.

6. The method of claim 4, wherein the accuracy metric comprises, for numeric extracted strings, an absolute difference or a fractional numeric difference between the numeric extracted string and its respective ground truth value.

7. The method of claim 1, wherein determining the similarity metric comprises determining a sorted list of the similarity metrics between the respective extracted string and each other extracted string of the plurality of first outputs.

8. The method of claim 7, wherein the pseudo-accuracy is an average of two or more accuracy metrics of the sorted list, wherein the two or more accuracy metrics comprise accuracy metrics corresponding to the highest similarity metrics of the sorted list.

9. The method of claim 8, wherein determining the average of the two or more accuracy metrics comprises determining a weighted average of the two or more accuracy metrics.

10. The method of claim 9, wherein the weighted average is configured to assign a higher weight to accuracy metrics associated with larger extraction errors.

11. The method of claim 9, wherein weights for the weighted average are based at least in part on the similarity metric.

12. The method of claim 9, wherein weights for the weighted average are based on ordering of the sorted list.

13. The method of claim 1, wherein the trained machine learning model is configured to predict the pseudo-accuracies based at least in part on extracted strings or raw confidence scores associated with the subsequent outputs.

14. A system for training a machine learning model to predict a pseudo-accuracy for strings extracted by a document extraction model, the system associated with a machine learning model and comprising:
one or more processors; and
a memory storing instructions that, when executed by the one or more processors, cause the system to perform operations comprising:
receiving a plurality of first outputs from the document extraction model and a corresponding ground truth value associated with each first output, each first output of the plurality of first outputs comprising an extracted string and a raw confidence score;
determining, for each first output of the plurality of first outputs, an accuracy metric based at least in part on the extracted string and the ground truth value associated with the respective first output;
for each extracted string of the plurality of first outputs:
determining a similarity metric between the respective extracted string and each other extracted string of the plurality of first outputs; and
determining a pseudo-accuracy for the respective extracted string based at least in part on the determined similarity metrics and the determined accuracy metrics;
generating training data based at least in part on the determined pseudo-accuracies and the plurality of first outputs; and
training the machine learning model, based on the training data, to predict pseudo-accuracies associated with subsequent outputs from the document extraction model.

15. The system of claim 14, wherein the accuracy metric indicates whether or not the extracted string fuzzily matches its respective ground truth value.

16. The system of claim 14, wherein the accuracy metric comprises an edit distance between the extracted string and its respective ground truth value.

17. The system of claim 14, wherein execution of the instructions for determining the similarity metric causes the system to perform operations further comprising determining a sorted list of the similarity metrics between the respective extracted string and each other extracted string of the plurality of first outputs.

18. The system of claim 17, wherein the pseudo-accuracy is an average of two or more accuracy metrics of the sorted list, wherein the two or more accuracy metrics comprise accuracy metrics corresponding to the highest similarity metrics of the sorted list.

19. The system of claim 18, wherein execution of the instructions for determining the average of the two or more accuracy metrics causes the system to perform operations further comprising determining a weighted average of the two or more accuracy metrics.

20. A method of predicting degrees of confidence in strings extracted by document extraction models, the method performed by an electronic device coupled to a machine learning model and comprising:

receiving a plurality of first outputs from the document extraction model and a corresponding ground truth value associated with each first output, each first output of the plurality of first outputs including an extracted string and a raw confidence score;

determining, for each first output of the plurality of first outputs, an accuracy metric based at least in part on the extracted string and the ground truth value associated with the respective first output;

for each extracted string of the plurality of first outputs:

determining a similarity metric between the respective extracted string and each other extracted string of the plurality of first outputs; and         determining a pseudo-accuracy for the respective extracted string based at least in part on the determined similarity metrics and the determined accuracy metrics;

generating training data based at least in part on the determined pseudo-accuracies and the plurality of first outputs;

training the machine learning model, based on the training data, to predict pseudo-accuracies associated with subsequent outputs from the document extraction model;

receiving a plurality of second outputs from the document extraction model, each second output of the plurality of second outputs including one or more of an extracted string and a raw confidence score; and     predicting, using the trained machine learning model, a corresponding pseudo-accuracy for each second output of the plurality of second outputs.

\* \* \* \* \*